May 1, 1928.

G. G. LIFE

TOY VEHICLE

Filed Dec. 23, 1926

1,667,940

Inventor
G. G. Life
By H. J. Sanders
Atty.

Patented May 1, 1928.

1,667,940

UNITED STATES PATENT OFFICE.

GEORGE GRANT LIFE, OF CHICAGO, ILLINOIS.

TOY VEHICLE.

Application filed December 23, 1926. Serial No. 156,576.

This invention relates to improvements in toy vehicles and more particularly to a pedal car for children's use. The principal object is to provide a neat, compact, efficient means of speedy transportation that is pedal-propelled.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts in both views.

Figure 1:
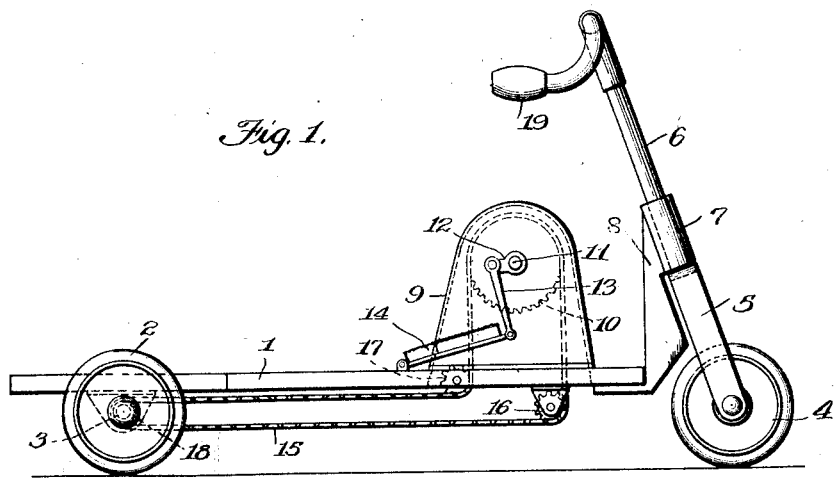
Fig. 1 is a view of the vehicle in side elevation.
Figure 2:
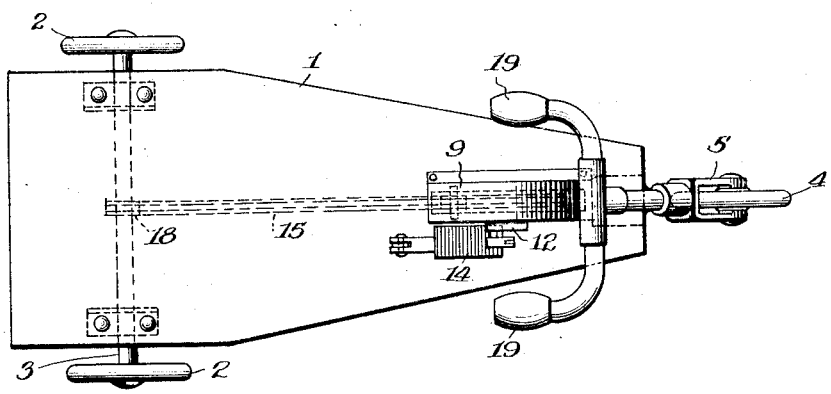
Fig. 2 is a top plan view of Fig. 1.

Many toy vehicles are designed either for operation by the child in a sitting posture, for operation by arm movement of cranks or the like, or it has been necessary for the child in a standing position to kick the vehicle along by striking one foot intermittently to the ground. This practice tends to throw the child off balance, his position is always precarious, a lateral impulse is imparted to the vehicle and its forward movement is, at best, more or less jerky and irregular.

The present invention provides a vehicle that is constructed and operated in a manner to enable the child to maintain his equilibrium at all times, to propel it by one foot applied to one pedal and this pedal can be operated, if desired, without taking the heel of the foot off the vehicle bed while the other foot rests firmly upon this bed and the hands may hold fast to the handle-bars.

The vehicle comprises the bed 1 supported upon rear wheels 2, connected by the axle 3, and a front wheel 4 engaged by the fork 5 at the lower end of the steering post 6 that passes through the sleeve 7 at the upper end of the standard 8 that is directly secured to the said bed 1.

Upon the forward end of the bed 1 is the housing 9 for the large sprocket wheel 10, the axle 11 of which is journaled in the said housing and connected by the crank 12 and pitman 13 to the single pedal 14 fulcrumed to the bed 1 adjacent the housing. With the foot resting upon the pedal or with the heel of the foot upon the bed of the vehicle and the toe upon the pedal the shaft 11 may be rotated.

The sprocket 10 is connected by sprocket chain 15, passing over idler sprockets 16, 17 carried by the bed 1, to a sprocket wheel 18 fast upon the rear axle 3. The child stands upon the vehicle bed with one foot engaging the pedal and with his hands grasping the handle-bars 19 and by manipulating the pedal he will impel the vehicle forward while easily maintaining his equilibrium and without the necessity of stepping off the vehicle or kicking with one foot.

What is claimed is:—

1. In a toy vehicle, a vehicle bed, a rear axle therefor, a housing at the forward end of said bed, a rotary shaft supported in said housing, a pedal fulcrumed to the vehicle bed and operatively connected to said shaft, a sprocket wheel fast upon said shaft, a sprocket wheel fast upon said rear axle, a sprocket chain connecting said sprocket wheels, and handle bars at the front end of said vehicle bed.

2. In a toy vehicle, a vehicle bed, a rear axle therefor, a housing at the forward end of said bed, a rotary shaft supported in said housing, a pedal fulcrumed to the vehicle bed and operatively connected to said shaft and operable by the toe of the operator's foot while the heel of the foot rests upon said bed, a sprocket wheel fast upon said shaft, a sprocket wheel fast upon said rear axle, idler sprocket wheels carried by said bed, a sprocket chain connecting said sprocket wheels and passing over said idler sprocket wheels, and handle bars at the front end of said vehicle bed.

In testimony that I claim the foregoing as my own I have hereto affixed my signature.

GEORGE GRANT LIFE.